Figure 1:
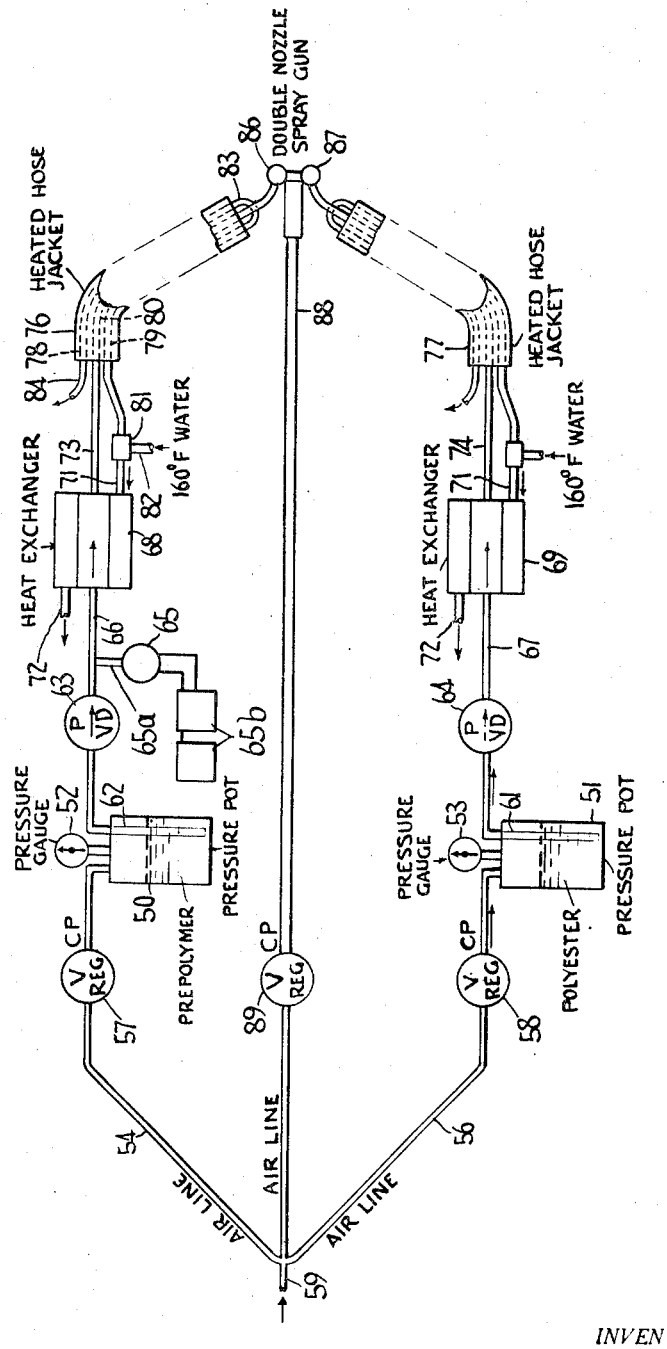

Jan. 29, 1957  J. J. REIS, JR  2,779,689
FORMING FOAMED POLYURETHANE RESINS
Filed July 19, 1955  2 Sheets-Sheet 1

INVENTOR.
JOSEPH J. REIS JR
BY
Oscar L. Spencer
ATTORNEY

Jan. 29, 1957  J. J. REIS, JR  2,779,689
FORMING FOAMED POLYURETHANE RESINS
Filed July 19, 1955  2 Sheets-Sheet 2

INVENTOR
JOSEPH J. REIS, JR.
Oscar h Spencer
ATTORNEY

United States Patent Office 2,779,689
Patented Jan. 29, 1957

2,779,689

FORMING FOAMED POLYURETHANE RESINS

Joseph J. Reis, Jr., Pittsburgh, Pa., assignor to Pittsburgh Plate Glass Company, a corporation of Pennsylvania Application July 19, 1955, Serial No. 522,923

12 Claims. (Cl. 117—104)

This invention relates to the preparation of solid, resinous, foamed polyurethanes and it has particular relation to the preparation of polyurethanes by the reaction of a diisocyanate and a polyester containing available hydroxyls and being the esterification product of a dicarboxylic acid and one or more alcohols containing two or more hydroxyl groups per molecule.

Valuable resinous materials have heretofore been prepared by reacting a diisocyanate, such as p-tolylene diisocyanate, or mixtures of isomers of the same, with a polyester of the alkyd type containing available hydroxyl groups. Polyesters suitable for the purpose may, for example, be prepared by reacting a dicarboxylic acid, preferably one which is free of ethylenic groups of the reactive type, with a di- or polyhydric alcohol, or preferably with a mixture of alcohols, one of which is dihydric and another of which is polyhydric.

When the polyesters and a diisocyanate are brought together, especially in the presence of water, rapid reaction takes place with the generation of much exothermic heat, polyester molecules are bridged together by polyurethane linkages and carbon dioxide is generated. The latter, under appropriate conditions, is entrapped in the mass to form polyurethane resins of high cellularity valuable for many uses, for example, as slabs or panels with or without backings and constituting an insulating material adapted to retard the transmission of heat by conduction. It may also be employed as a cushioning material, as a filler for airplane propellers, as a sound deadening material, as a covering or lining for pipes and other articles having non-planar surfaces. The general character of the reactions involved has been discussed in an article by O. Bayer et al., "Rubber Chemistry and Technology," volume 23, pages 812 through 835.

In the preparation of resins and foams of the foregoing type, difficulty has heretofore been experienced owing to the extreme rapidity of the reaction when the several components are brought together under reaction conditions. The reaction is so fast that the mixtures often tend to set up or resinify before adequate mixing of the several components can be attained. Also there is a tendency for the non-homogeneous mixtures locally to overheat with the formation of blow holes and other imperfections.

Experiments have been conducted in which the polyester component and the diisocyanate component have been mixed by applying them as separate sprays to the desired supporting surface or by otherwise distributing them into each other as rapidly as possible as, for example, by passing the two components through a turbomixer. It would appear that in many instances, the reaction is so rapid that before adequate intermingling of the polyester component and the diisocyanate component can be obtained, the reaction has progressed so far that gels are formed prematurely or the diisocyanate in its reaction with the several components of the mixture to form gas undergoes reaction prematurely with the liberation of the gas at such stage that much of it escapes and the foam structure tends partially or completely to collapse.

The gels formed prematurely in the apparatus may tend to clog the latter or to build up upon the surfaces of the same, thus necessitating frequent shut-downs for cleaning and rendering it difficult to stop a run without emptying and cleaning the apparatus in order to obviate gelation of residues while it is idle.

The reactions involved in polymerization and generation of gases in the foamable mixtures are also highly exothermal and result in the production of much heat which tends to exaggerate or increase the premature gelation and foaming reactions and at the same time, the temperature may go so high as to produce objectionable decomposition of the product. Furthermore, the temperature tends to volatilize the diisocyanate component thus causing the loss of valuable material and tending to contaminate the atmosphere to create a hazard to the health and comfort of the operators.

This invention is based upon the discovery that in the preparation of foamed polyurethane resins the foregoing difficulties can be reduced or obviated by preliminarily reacting a portion of the polyester with the diisocyanate component in such proportion as to provide a component A termed a prepolymer. The prepolymer is a relatively stable, sprayable or nearly anhydrous liquid which is capable of reacting with more polyester. The remainder of the polyester is made up with a hydrating agent as a sprayable dispersion, but without diisocyanate and herein is termed component B. It too, in the absence of isocyanate is stable. The two components (A and B) are separately stored and when they are to be mixed and foamed, they are sprayed concurrently or sequentially as mists from separate orifices upon a common surface. The two components are thus not commingled to form a highly reactive mixture until they are in desired position for copolymerization and foaming. Therefore, premature foaming and gelling are obviated. The added polyester and water react quickly with the prepolymer product with the liberation of carbon dioxide to form a foam and with cross-linking reaction to convert the commingled materials into a solid, durable state. The reactions are much the same in end products as are obtained by mixing the whole of the polyester with the diisocyanate and conducting the reaction in one stage.

In the prepolymer, the diisocyanate is at least partially combined with a portion of the polyester so that the volatility thereof is greatly reduced and losses of diisocyanate are reduced with concomitant reduction of the health hazard and an increase in the comfort of the operators of the apparatus. The prepolymer mixes very readily with the dispersion of polyester when the two are brought together, thus reducing local overheating and other undesirable effects due to improper mixing. It will be apparent that the effects of overheating are further minimized because in the initial reaction to form the prepolymer, a considerable proportion of the total heat of reaction is given up, thus effecting a distribution of the evolution of heat and reducing the peak temperature resulting when all components are reacted in a single stage.

The techniques of this invention are adapted for preparation of either flexible or rigid resins but are especially valuable in the preparation of more flexible types.

The characteristics of some approved components which may be employed in the practice of the present invention will now be described.

*The polyester component*

The polyester components of the prepolymer and of the polyester mixture containing the water may be the same or different. They are resins which are preferably of relatively high hydroxyl value and low acid value. They are soluble and liquid or fusible materials. The acid components of the polyesters preferably are of the dibasic type, or polybasic type and usually are free of reactive unsaturation such as ethylenic groups or acetylenic groups. The unsaturation, such as occurs in the rings of such aromatic acids as phthalic acid, terephthalic acid, isophthalic acid or the like, is non-ethylenic and non-reactive. These acids, for purposes of the present invention, may be regarded as being saturated. They may, therefore, be employed in the preparation of the polyesters herein disclosed. Other non-ethylenic dicarboxylic acids free of reactive unsaturation comprise those acids in which the carboxyl groups are interconnected by open hydrocarbon chains. Suitable acids of this type include succinic acid, adipic acid, sebacic acid, azelaic acid and others containing up to about 10 carbon atoms in the hydrocarbon chain. Mixtures of two or more of these acids may be utilized. In most instances, adipic acid is presently preferred either as the sole acid compound or as a mixture with other dibasic acids such as the phthalic acids previously mentioned.

The alcohol component or components of the polyester contain a plurality of hydroxyl groups and usually, though not necessarily, they comprise a mixture of alcohols one of which is dihydric while the other contains at least three hydroxyls. The dihydric alcohols may be selected from a class such as the following:

Propylene glycol
Dipropylene glycol
Ethylene glycol
Diethylene glycol
Polyethylene glycol, or the like The second alcohol containing at least three hydroxyls may be selected from a class comprising:

Glycerol
Pentaerythritol
Trimethylolethane
Trimethylolpropane
Mannitol, and others The polyesters containing a high percentage of dihydric alcohol component tend to be more flexible and thermoplastic. On the other hand, those alcohols such as glycerol, pentaerythritol, and the like, containing three or more hydroxyls with dibasic acids, form polyesters which upon reaction with diisocyanate tend to form hard thermoset foamed resins. By proper control of the ratios of the two types of alcohols, the cross-linking and therefore the hardness and thermosetting characteristics of the polyester-diisocyanate reaction products may be controlled. Polyesters containing only one type of alcohol are not precluded. The proportion of the sum of the alcohol components with respect to the acid components usually is substantially in excess of those commonly employed in the preparation of alkyd resins and may be, for example, within a range of about 15 to 50 percent excess over stoichiometric ratios. For tough, flexible, resilient foamed products, a preferred molecular ratio of dihydric alcohol to alcohol of higher number of hydroxyl groups is about 18 to 1. This ratio decreases inversely with increasing rigidity in the foamed product.

The esterification reaction employed in preparation of the polyester is substantially conventional and comprises heating the mixture, with or without esterification catalyst, in well known manner to a temperature to effect evolution of water, but below that of substantial charring or darkening of the product, e. g. to 250° F. to 400° F., or thereabouts. The reaction may be effected in the presence of a non-reactive diluent, such as xylene, which will distill azeotropically to assist in carrying away the water of reaction. The reaction is preferably continued until the product is viscous, but liquid, or at least becomes liquid when it is heated. The acid value usually is reduced, often as low as practicable, for example, below 20 and preferably below about 12. Products of an acid value of 1 or below are obtainable and may be advantageously employed in the preparation of rigid or flexible foams. The ratios, hydroxyls to carboxyls are correspondingly high, for example, in a range of 50 up to 500 or 600. Water of reaction is stripped from the polyester employed in preparing the prepolymer, usually to such degree as to provide a substantially anhydrous product, or one which is as nearly anhydrous as is practical to obtain. Probably, in most instances, the residual water content of the polyester will not exceed about 0.1 or 0.2 percent and may be substantially zero.

*The diisocyanate component*

The polyester may be mixed with a wide variety of diisocyanates in such amounts as to provide a substantial excess of diisocyanate molecules as compared with the available hydroxyls. Diisocyanates which may be interacted with polyesters in accordance with the provisions of the present invention contain the group

where R is aromatic, heterocyclic, aliphatic or a mixed group comprising moeties from two or more of these classes. Preferably, it contains from about 2 to 19 carbon atoms. The hydrocarbon group may also contain chlorine or other substantially non-functioning groups. The following constitutes an illustrative group of diisocyanates which may be employed in the practice of the invention:

Diphenyl diisocyanate
Triphenyl diisocyanate
Chlorophenyl-2,4-diisocyanate
Ethylene diisocyanate
1,4-tetramethylene diisocyanate
p-Phenylene diisocyanate
p-Tolylene diisocyanate (preferably as a mixture of 2,4 and 2,6 isomers)
p'-Diisocyanate diphenylmethane
Hexamethylene diisocyanate, and others The p-tolylene diisocyanate or mixed isomers containing the same because of general availability and satisfactory operation in the process, are presently preferred, though, of course, as commercial conditions change or special requirements change, this preference is also subject to change.

In preparing a prepolymer of a polyester and a diisocyanate in accordance with the provisions of the present invention, it is preferable that the polyester in the prepolymer be so proportioned that approximately 50 percent of the total thereof, e. g. 30 percent to 70 percent, of the total is embodied in the prepolymer component. It is necessary that substantially the total of the diisocyanate component be embodied in the prepolymer fraction. The diisocyanate component of the prepolymer will vary in amount dependent upon the available hydroxyls in the polyester. Usually the diisocyanate will be employed in a ratio to provide about 2 to 5 moles of diisocyanate per molar equivalency of combined hydroxyls and carboxyls in the polyester of the prepolymer component.

A catalyst, which may be the same as is subsequently described, is also added and the mixture of prepolymer components then reacts. The polyester and the diisocyanate will react to form a prepolymer with or without catalysts and with or without heating, but usually for purposes of this invention it is preferred to add catalyst and to apply but little or no extraneous heat. The heat evolved in forming the prepolymer, though considerable, is less than when the polyester and the diisocyanate are mixed in conventional manner (in the presence of water) in approximately the ratios desired in the finished product.

The catalyst

In order to prepare a prepolymer of the polyester and the diisocyanate, in accordance with the provisions of the present invention, the two are mixed together. If desired, catalyst designed to promote the preliminary reaction between the two components is added. N-alkyl morpholine is presently preferred for this purpose, but may be replaced by other catalyst, for instance, the tertiary amines such as trimethyl amine, triethyl amine, dialkylamino alcohol, or a commercial product sold as Ethameen-18-15, which is understood to be a tertiary amine in which the hydrocarbon chains are relatively long containing for example 10 to 18 carbon atoms per chain. If preferred, the catalyst may, as above stated, be omitted from the prepolymer phase, inasmuch as reaction between the polyester and the diisocyanate may be effected in the absence of the same, either by heating the mixture or by allowing it to stand for a sufficient period of time.

Still other catalysts which may be employed comprise quaternary ammonium compounds which under conditions of reaction are adapted to decompose to liberate tertiary amines in situ. Examples of such materials are salts of tertiary amines such as N-methyl morpholine and anhydrides of dicarboxylic acids such as acetic acid. These salts are readily formed merely by bringing the reactants together.

By varying the amounts of diisocyanates in the polyester, it is possible to increase or decrease the viscosity of the polyester prepolymer to suit specific conditions. The choice is influenced by the functionality of the polymer. The prepolymer may comprise, for example, from about 25 to 100 parts of diisocyanate, such as tolylene diisocyanate, per 100 parts of resin; or in event that a highly liquid prepolymer is desired, this proportion of tolylene diisocyanate may be increased approximately to 600 parts. Rules for determining satisfactory proportions in particular cases may be stated as follows.

The proportion of diisocyanate to polyester in preparation of prepolymers or adducts is influenced by certain characteristics of the resin including hydroxyl number, acid number, and water content; isocyanate equivalent is based upon these. For example, the resin of Example A in column 6 has a combined hydroxyl number and acid value of about 70. To obtain the isocyanate equivalent we simply divide this number into 56,100.

$$\frac{56,100}{70} = \text{about } 800 = \text{isocyanate equivalent}$$

This means that about 800 grams of polyester are needed for one mole of an isocyanate or one half mole of a diisocyanate. To be specific, 800 grams of polyester is equivalent to 87.5 grams tolylene diisocyanate. At least 100 percent excess diisocyanate is necessary to produce a suitable prepolymer.

Polyesters having higher hydroxyl numbers, etc., will require higher proportions of diisocyanate. For example, a polyester with zero acid value and a hydroxyl number of 400 will require:

$$\frac{56,100}{400} = \text{about } 140$$

About 140 grams of polyester is required per mole of isocyanate groups or per one half mole of diisocyanate, to saturate the hydroxyl groups.

A one hundred percent excess is then needed to insure a relatively stable product. Usually considerably more than the 100 percent excess is necessary to give a product of suitable viscosity for spray application.

As already indicated, N-alkyl morpholines, such as N-methyl morpholine, are particularly desirable catalysts of the reaction. This is true because they strongly and efficiently promote the reaction and also because they constitute good solvent media which tend to reduce the viscosity of the prepolymer, where the latter is overly viscous for most effective spraying. To this end, the N-methyl morpholine may be employed in larger amounts than are necessary for catalysis of the reaction. Needless to say, N-methyl morpholine may be added to prepolymer after its formation and before mixing of the same with polyester emulsion by spraying. Amounts thereof up to 10 or 12 percent by weight based upon the polyester may be introduced at appropriate stages in the reaction.

If the catalyst is incorporated into the mixture forming the prepolymer prior to reaction of said mixture, the catalyst promotes the formation of the latter and often the residual catalyst is sufficient to attain the desired reactivity when the prepolymer is sprayed with the emulsion of polyester upon a suitable support. It is apparent that the catalyst may be in components A or B to the exclusion of the other, or it can be divided between the two components in any desired proportion.

The prepolymer component, free of water and with or without added catalyst, if desired, may be and preferably is incorporated with an appropriate emulsifying agent, such as is subsequently disclosed, though this component is not always required in part A of the foamable mixture, if it is present in component B.

The water component

Added polyester for spraying concurrently with the prepolymer from a separate spray orifice preferably is made up to contain the water (either free or as a hydrated salt) necessary for completion of the reaction involved in the conversion of the prepolymer-polyester mixture upon the support into a foamed polyurethane resin. The water may be employed as water per se in an amount for example of about 1 to 10 parts by weight per 100 parts of polyester. To facilitate the thorough commingling of the water with the polyester in the second component of the foamable mixture, there is added an emulsifying agent, such as Emcol-H-77, sold by the Emulsol Corporation and understood to be a liquid mixture of an anionic emulsifier and a non-ionic emulsifier one being a polycarboxylic blend and the other being a sulfonated fatty oil acid; Tween 40 which is understood to be a reaction product of ethylene oxide and polyoxyethylene sorbitan monopalmitate; Tween 60 which is understood to be a reaction product of ethylene oxide and sorbitan monostearate; Triton-X-100 which is understood to be a condensation product of an alkyl phenol and ethylene oxide and others.

Use of excessive amounts of emulsifier dilutes the mixture and the increase in emulsifying action is not commensurate with the other and often undersirable effects attending the use of excesses. The water, if desired, may be replaced by a hydrating agent or latent source of water such as a hydrated salt as represented by the trihydrate of sodium acetate, the decahydrate or heptahydrate of sodium sulfate, (Glauber's salt), the heptahydrate of magnesium sulfate, or other agent which at the temperatures attained in the reactions between the polyester and the prepolymer, liberate water in situ. If hydrated salts are employed as a source of water, the amount thereof should be sufficient to provide water in the aforementioned range.

The following constitute representative examples of polyesters which may be employed in the preparation of prepolymers as component A and also for emulsification with water or other hydrating agents to provide polyester component B which may be intersprayed from separate orifices by the methods herein disclosed to provide foamable and thermosetting compositions.

EXAMPLE A

This polyester was prepared from a mixture comprising:

| | |
|---|---|
| Adipic acid | 16 moles. |
| Diethylene glycol | 18 moles. |
| Glycerol | 1 mole. |
| Catalyst (paratolylenesulfonic acid) | 0.1 percent based upon the mixture. |

The mixture was reacted in accordance with conventional procedures to form a liquid resin having a hydroxyl value in a range of 60 to 80 and an acid number of 12 or less. The polyester is liquid in form. This polyester is of rather low hydroxyl value and is often employed in forming more flexible foams. The glycerol of this polyester may be replaced in total or in part by trimethylol propane. Similarly, the diethylene glycol may be replaced by hexanediol. The polyester is useful in components A and B of applicants' sprayable mixtures.

Types of resins well adapted for the preparation of more rigid foams are represented by the following:

EXAMPLE B

The resinifiable mixture comprised:

| | Moles |
|---|---|
| Phthalic anhydride | 2 |
| Adipic acid | 10 |
| Trimethylol propane | 20 |

The mixture preferably is cooked to an acid value of about 1 and a hydroxyl value of about 450. The resin is liquid and the high hydroxyl value renders it especially useful in forming components A and B of rigid foams.

EXAMPLE C

The resinifiable mixture comprised:

| | Moles |
|---|---|
| Phthalic anhydride | 1 |
| Adipic acid | 5 |
| Glycerol | 8 |

The mixture preferably is cooked to an acid number of about 10. The polyester is of high hydroxyl value and is a liquid product well adapted for mixing with diisocyanates, emulsifying agents and catalysts as herein disclosed. Components A and B may both be formed from this polyester. The foamed products of this polyester are of the rigid type.

EXAMPLE D

A polyester was prepared comprising:

| | Moles |
|---|---|
| Glycerol | 7.6 |
| Adipic acid | 5.0 |
| Phthalic anhydride | 1.0 |

The mixture was cooked to an acid value of 42–46, a hydroxyl number of 400 to 500 and a viscosity of 45,000 cps. to 100,000 cps. It could be mixed with the diisocyanates such as a mixture of tolylene diisocyanates to form a prepolymer component A. A much higher proportion of isocyanate would be necessary. The polyester could be mixed with emulsifying agent, hydrated salt such as the decahydrate or heptahydrate of sodium sulfate to form component B. The two components could be mixed by spraying and foamed.

EXAMPLE E

A further liquid polyester comprising a fatty acid was prepared. The polyester contained:

| | Moles |
|---|---|
| Adipic acid | 4 |
| Phthalic anhydride | 1 |
| Oleic acid | 2 |
| Glycerol | 8 |

The polyester may be used in components A and B of applicants' mixture.

EXAMPLE F

In this example, the polyhydric alcohol component comprised a mixture of diethylene glycol and pentaerythritol. The proportions of the components of the polyester were as follows:

| | Moles |
|---|---|
| Adipic acid | 5 |
| Phthalic anhydride | 1 |
| Diethylene glycol | 4 |
| Pentaerythritol | 3.6 |

The polyester, when cooked, forms a polyester suitable for use in components A and B of the several foamable compositions hereinafter described.

EXAMPLE G

The polyester of this example embodied a mixture of phthalic anhydride and adipic acid as the dibasic acid component. The polyhydric alcohol component comprised trimethylol propane. The proportions of the several ingredients were as follows:

| | Moles |
|---|---|
| Phthalic anhydride | 1 |
| Adipic acid | 5 |
| Trimethylol propane | 9.2 |

The product was cooked to a hydroxyl value of 473 and an acid value of approximately 1. This polyester is very well adapted for use as components A and B of rigid foams.

Any of the polyesters of the foregoing Examples (A through G) may be incorporated with a diisocyanate such as tolylene diisocyanate in an amount to provide a liquid, sprayable prepolymer which amount usually will involve diisocyanate in a range of about 20 to 600 parts per 100 parts of polyester dependent upon the fluidity desired in the prepolymer component. Where the proportion of diisocyanate is very high, the excess dilutes the polymer and promotes fluidity thereof.

The following constitutes a generalized formulation of a prepolymer (component A) prepared in accordance with this invention:

| | Parts by weight |
|---|---|
| Polyester | 100 |
| Diisocyanate | 20–600 |
| Catalyst | 0–20 |
| Emulsifier | 0–5 |

The polyester-water dispersion (component B) may be generalized as follows:

| | Parts by weight |
|---|---|
| Polyester | 100 |
| Catalyst | 0–10 |
| Emulsifier | 0.1–10 |
| Water (free of latent) | 0.1–10 |

These are stirred together to form a sprayable mixture.

The two may be sprayed upon common supports by use of any spray apparatus capable of discharging the components (A and B) from separate orifices so that they commingle only when they strike the mold or surface where they are to be foamed and polymerized.

The preparation of a typical prepolymer and the subsequent application of the same as a spray concurrently with the application of a spray of polyester emulsion is illustrated by the following example.

EXAMPLE I

The polyester in this example corresponded to that disclosed in Example A. This polyester was of a hydroxyl value of 60 to 80 and was of an acid value of about 3. For purposes of preparing a prepolymer, a mixture was prepared comprising:

| | Parts by weight |
|---|---|
| Polyester (Example A) | 100 |
| Tolylene diisocyanate (Mondur-TD) | 100 |
| N-methyl morpholine (catalyst) | 2 |
| Emcol-H-77 (emulsifier) | 2 |

This prepolymer from the mixture may be sprayed at once, but may be stored for several days at room temperature or longer under refrigeration. The prepolymer is a liquid product of a viscosity adapting it for spray application by a conventional spray gun. This prepolymer constitutes component (A) of applicants' spray system. The polyester component (component B) of the spray system was made up as a liquid, sprayable dispersion as follows:

| | Parts by weight |
|---|---|
| Polyester (Example A) | 100. |
| N-methyl morpholine | 2. |
| Emcol-H-77 | 2. |
| Water | 1 to 3 (preferably 2). |

Components A and B of the system are maintained in separate containers and when it is desired to spray them upon a surface or into a mold, they are discharged through separate conduits having orifices which discharge the two concurrently so that the droplets as they strike the surface are completely and thoroughly intermixed. In the spraying operation, a pair of spray guns, one for each liquid (A or B) may be employed, the sprays being directed upon the same spot. However, for manual operations it is usually preferred to employ a single spray gun having separate feed lines and separate orifices for each line.

EXAMPLE II

It has also been found practicable to incorporate with the polyester component of the prepolymerizable mixture certain compatible resins such as a phenolic resin in an appropriate stage of polymerization. In an illustrative example, a Bakelite resin sold commercially as Bakelite-B-R-Q-18759 was incorporated with a polyester which was substantially the same as that of Example A. The phenolic resin was employed in an amount of about 5 parts per 100 parts of the polyester. The range of the phenolic resin to polyester may conveniently extend from 1 part to 25 parts per 100 parts of said polyester with a preferred range being from about 5 to 10 parts. The polyester and the phenolic resin may merely be dissolved in each other or if preferred they may be conjointly polymerized, for example, by adding the phenolic resin to the reaction mixture employed in the preparation of the polyester and then cooking the mixture to effect esterification reaction. The polyester, when so modified, may be employed in the preparation of the prepolymer as in Example I. Likewise, the modified polyester may be employed as component A constituting one of the sprayable mixtures as disclosed in the preceeding example. The two components (A and B) after application by spray to an appropriate support, may be foamed and cured to a solid, resinous state in the usual manner. The presence of the phenolic resin modifier is sometimes advantageous, inasmuch as it has been found that it substantially reduces any tendency of the foamable mixture to form puff spots or large bubbles between the resin and the supporting surface.

The components A and B of applicants' interpolymerizable mixture, respectively comprising prepolymers of polyesters and diisocyanates and emulsions of polyesters and a hydrating agent, are susceptible of use in various types of apparatus. It is prerequisite that the two components be kept separate from each other until they are in their final position upon the surface to be treated or in the mold and that they then be mixed substantially instantaneously as the layer thereof is built up. They may be applied in job operations as, for example, upon isolated individual objects such as parts of buildings and other articles. They may also be employed to coat a continuous succession of articles or a strip article upon a moving conveyor.

Figure 2:
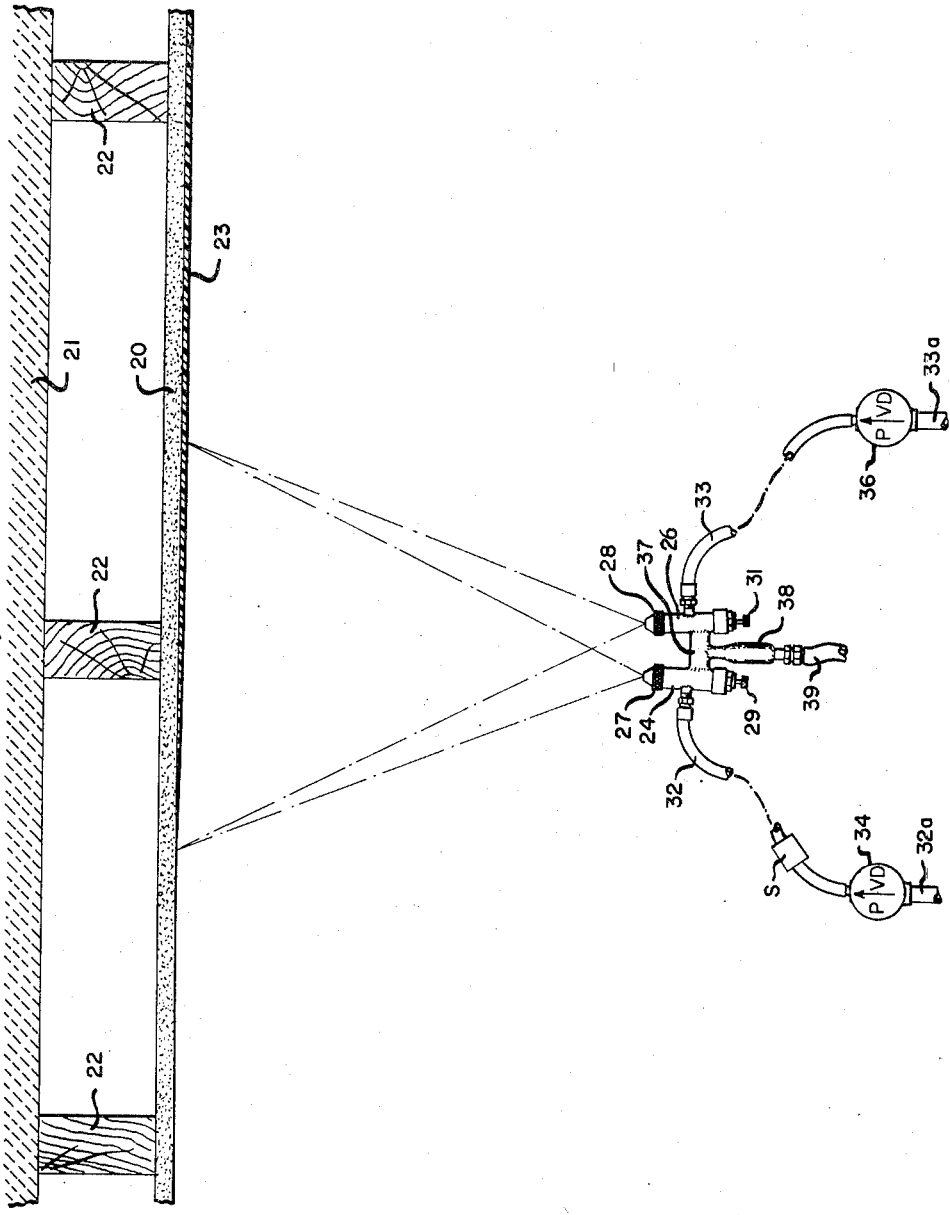

Illustrative embodiments of apparatus adapted for use in applying foams to various articles or for forming foams as a discrete material are diagrammatically illustrated in the drawings in which:

Fig. 1 is a flow diagram of a system for applying concurrently a spray of an aqueous emulsion of polyester and a prepolymer of a polyester and a diisocyanate; and Fig. 2 illustrates one type of spray apparatus which may be used in applying the two components to a surface and the concurrent application of components A and B to a surface by use of said apparatus.

In the process and apparatus as illustrated in Fig. 2 of the drawings, an article such as a wall of a building embodying opposed rigid curtain elements 20 and 21 held in spaced relationship by framing elements 22 is shown as being provided with a foamed layer of polyurethane resin, as indicated at 23. The apparatus employed in the operation comprises a pair of slightly convergent nozzle tubes 24 and 26 which may be of conventional design and are provided with heads as indicated at 27 and 28 designed to deposit the material being sprayed in an appropriate pattern. The tubes are further provided with valves such as needle vales 29 and 31, designed for regulating and metering the flow of air through the tubes. The tubes are also connected as for example by means of flexible tubes or hose 32 and 33 to a pair of pumps, indicated diagrammatically at 34 and 36 as being variable delivery pumps. The pumps are positively mechanically connected together as by a common drive (not shown) to provide a duplex pump designed accurately and positively to proportion the feed of components A and B to their respective nozzles. However, each pump may also be separately driven. Since suitable proportioning pumps are commercial articles, it is not deemed necessary to describe the mechanism thereof. Positive displacement gear pumps such as are often employed in spinning rayon are suitable.

The pumps are also provided with connections 32a and 33a leading to reservoirs (not shown) for the respective components.

The two tubes (24 and 26) are cross connected by a bar 37 which may be tubular and being designed to discharge gaseous medium into the tubes for purposes of breaking up the components passing through the tubes, and to deliver them as fine sprays from the heads 27 and 28.

The apparatus is shown as comprising a handle 38 adapted to be grasped manually and being connected to the transverse bar 37. It is provided with a tube (preferably flexible) 39 for the supply of air, carbon dioxide, or other gaseous medium to the tubes 24 and 26 for impelling and breaking up the liquids from the nozzles. The pumps and/or their hose connection may be provided with jackets (not shown) for a heating medium or for electrically heated mantles by means of which the liquids can be brought to and maintained at precisely the optimum viscosity for spraying. Such jackets or mantles for purposes of simplicity, have been omitted from the drawings.

A suitable fluid pressure operated switch indicated at S for controlling the pump motor current may also be disposed in one of the conduits 32, 33 or 39 so that when the apparatus is not spraying, the back pressure in the system shuts off the motor or motors. The apparatus may also be provided with trigger valves or other valve mechanism which can conveniently be operated for purposes of shutting off the flow of liquids and air when desired. Since the elements are conventional, it has not been deemed necessary to show them in detail.

It is to be observed that the two spray tubes 24 and 26 are disposed in slightly convergent relationship so that insofar as practicable the sprays converge at the proper distance thus tending to intermix the droplets very thoroughly and substantially as they strike the supporting surface, namely the curtain 20. However, complete intermixing of the sprays while they are in transit to the surface is not essential since adequate mixing of the droplets from the two nozzles may be obtained by reciprocating the sprays across the surface in such manner that thorough overlapping thereof is obtained. It will be recognized that the sprays comprising minute droplets from the two nozzles, as they strike with considerable force upon the surface undergoing treatment, are adequately and uniformly dispersed in each other so that highly uniform foaming can take place without any undue tendency of the foamable mixture locally to overheat.

The normal atmospheric temperature, especially when accompanied by the exothermal rise characterizing the interpolymerization between the prepolymer and the polyester emulsion is adequate to cure the mixture within a reasonable time. This is especially true in those instances where one or both components A or B contain an efficient catalyst of interpolymerization such as an N-alkyl morpholine, such as N-methyl morpholine. The mixture within a very short time after application will begin to foam and to gel and ultimately, if allowed to stand even at atmospheric temperature, will cure to provide a foam which is flexible or rigid, dependent upon the components and the proportions thereof. If desired the curing rate can be further accelerated by application of heat such as radiant heat to the surface.

The process is illustrated as being applied to the coating of a wall such as that of a building or of a cabinet. However, it will be apparent that the same apparatus and technique may be employed to the coatings of various other articles where, by reason of isolation, or by reason of the small number of articles to be treated, it is not commercially practicable to employ a more elaborate system such as is capable of continuous operation in treating a multiplicity of articles or a continuous band or web of material.

A further elaboration of the apparatus illustrating more completely a general system for use in spraying the prepolymer and polyester in accordance with the provisions of the present invention to form a foamed polyurethane resin is illustrated in Fig. 1 of the drawings. In this embodiment of apparatus, prepolymer and a dispersion of polyester are contained respectively in pressure pots 50 and 51. These pots are of conventional design and are closed so that a gaseous medium, such as air or carbon dioxide, under pressure can be confined above the liquid in the pot. Gauges indicated at 52 and 53 provide convenient means for checking the pressure from time to time. Gaseous medium is supplied to the pots respectively by air lines 54 and 56 having constant pressure outlet valves 57 and 58 disposed therein. Lines 54 and 56 are connected to a supply line 59 leading to a source of gas under pressure (not shown). Outlet lines 61 and 62 from the pressure pots lead to variable delivery pumps 63 and 64 which may be driven by a common motor or by separate motors (not shown) as may be desired and which function as metering means to supply prepolymer and polyester components in proper proportions with respect to each other.

Means automatically to start and stop the motors of the pump is indicated diagrammatically as comprising, a fluid operated switch known as a "Pressuretrol" switch 65 which is connected by a line 65a with one of the fluid conducting lines, e. g. line 66 so that when the pressure in the line goes up, due to the stopping of the spray gun (to be described), the switch is opened. The switch may be connected directly in the circuits of the motor, or they may be connected in circuit with conventional motor starters 65b which start and stop the motor when the switch 65 is operated by changes of pressure in the fluid conducting lines, e. g. line 66. When the pressure in the system drops owing to the opening of the valves of the spray gun, the switch 65 is closed to start the motor and thus to effect the flow of fluids in the system, forming the sprays.

It is to be recognized that in some instances, the prepolymer and the polyester are relatively viscous and in order to reduce the viscosity thereof to a value suitable for spraying operations, it may be desirable to warm one or both of them. For this purpose the feed lines 66 and 67 are discharged into conventional heat exchangers 68 and 69. The heat exchangers are provided with inlets 71 and outlets 72 for the circulation of a heated medium such as water or the like. In a specific example, this medium is maintained at a temperature of about 160° F. which is found to be adapted to maintain the prepolymer and polyester components as disclosed herein at a satisfactory viscosity. Obviously, this temperature may be varied dependent upon the viscosity desired in the spraying operation and also depending upon the inherent viscosity of the prepolymer and polyester employed.

Prepolymer and polyester are respectively discharged from the heat exchangers through hose connections 73 and 74 which, as indicated at 76 and 77, are provided with flexible jackets. These jackets, in the embodiment shown, comprise flattened elongated strips of rubber or other flexible plastic having three channels 78, 79 and 80 extending longitudinally thereof. The hose connections are strung through the central channel 80. The side channels indicated respectively at 78 and 79 in each of the jacket elements provide means for the circulation of the heated medium through the jacket. Channels 79, as indicated are joined to T-connections 81 which are further joined to the inlets 71 of the heat exchangers and to supply lines 82 through which heat transfer medium is circulated simultaneously to the heat exchangers and to the hose connections. The channels 78 and 79, at the ends opposite the inlet for heat transfer medium, are cross connected by tubes 83 of metal or other suitable material so that heat exchange medium flowing up through the channels 79, crosses over through the tubes 83 and discharges through outlet tubes 84.

Tubes 73 and 74 after passing through the heated jackets discharge into spray gun tubes 86 and 87 which are identical with the tubes 24 and 26 already described. Further description thereof is not deemed to be necessary at this time. The gaseous medium under pressure is also supplied to the spray gun through a tube or hose line 88 having a constant pressure outlet valve 89 disposed therein and further being connected to the line 59 thus supplying gaseous medium under pressure to the spray gun in order to break up the prepolymer and the polyester components into relatively fine sprays which as they strike an article to be coated, are thoroughly intermixed thus promoting uniform foaming and polymerization of the mixture.

I claim:

1. In a method of forming a polyurethane resin foam upon a solid surface, the steps of spraying from separate orifices (A) a liquid, anhydrous, sprayable, relatively stable prepolymer of a diisocyanate and a polyester of an alcohol containing at least 2 hydroxyls and a dicarboxylic acid and (B) an aqueous dispersion of a polyester which is also an alcohol containing at least 2 hydroxyls and a dicarboxylic acid, impinging the two sprays upon said surface and effecting foaming and curing of the resultant mixture.

2. In a method of forming a polyurethane resin foam upon a solid surface, the steps of spraying from separate orifices (A) a sprayable liquid, anhydrous, relatively stable prepolymer of a diisocyanate and a polyester of an alcohol containing at least 2 hydroxyls and a dicarboxylic acid and (B) a dispersion comprising a polyester which is also of an alcohol containing at least 2 hydroxyls and a dicarboxylic acid, water and an emulsifying agent and impinging the two sprays as an intimate mixture upon a common surface and effecting foaming and curing of the mixture.

3. In a method of forming a polyurethane resin foam upon a solid surface, the steps of spraying from separate orifices (A) a liquid, anhydrous, sprayable, relatively stable prepolymer of a diisocyanate and a polyester of an alcohol containing at least 2 hydroxyls and a dicarboxylic acid and (B) an aqueous dispersion of a polyester which is also of an alcohol containing at least 2 hydroxyls and a dicarboxylic acid, one of said components A and B containing a catalyst of reaction between a diisocyanate and an alcohol, impinging the two sprays as an intimate mixture upon a common surface and effecting foaming and curing of the mixture.

4. The method of claim 3 in which the catalyst is a teritiary amine.

5. The method of claim 3 in which the catalyst is an N-alkyl substituted morpholine.

6. In a method of forming a polyurethane resin foam upon a solid surface, the steps of spraying from separate orifices (A) a liquid, sprayable, anhydrous, relatively stable prepolymer of a diisocyanate and a polyester of an alcohol containing at least 2 hydroxyls and an alcohol and (B) a dispersion of (1) a polyester which is also of an alcohol containing at least 2 hydroxyls and a dicarboxylic acid (2) water and (3) a dispersing agent, one of the components A and B containing a catalyst of formation of polyurethane resin, impinging the sprays from the two orifices as an intimate mixture upon the solid surface and effecting foaming and curing of the mixture.

7. The method of claim 6 in which the catalyst is an N-alkyl morpholine.

8. In a method of forming a polyurethane resin foam upon a solid surface, the steps of spraying from separate orifices (A) a liquid, anhydrous, sprayable, relatively stable prepolymer of a diisocyanate and an alcohol containing at least 2 hydroxyls and adipic acid and (B) an aqueous dispersion of a polyester which is also of an alcohol containing at least 2 hydroxyls and adipic acid, the latter polyester further containing a dispersing agent and an N-alkyl morpholine, collecting the two sprays as intimate mixtures upon said surface and effecting foaming and curing of the mixture.

9. In a method of forming a polyurethane resin foam upon a solid surface, the steps of spraying from separate orifices (A) a diisocyanate and a polyester of an alcohol mixture comprising a dihydric alcohol and an alcohol containing at least 3 hydroxyls and adipic acid and (B) an aqueous dispersion of a polyester which is of an alcohol containing at least 2 hydroxyls and a dicarboxylic acid, said dispersion containing an N-alkyl morpholine, impinging the sprays as an intimate mixture upon a common surface and effecting foaming and curing of the mixture.

10. The method of claim 9 in which the diisocyanate is p-tolylene diisocyanate.

11. The method of claim 10 in which the dihydric alcohol is diethylene glycol.

12. In a method of forming a polyurethane resin foam upon a solid surface, the steps of emitting from separate convergently directed orifices (A) a sprayable, liquid, anhydrous, relatively stable prepolymer of a diisocyanate and a polyester of an alcohol containing at least two hydroxyls and a dicarboxylic acid and (B) an aqueous dispersion comprising a polyester which is also of an alcohol containing at least two hydroxyls and a dicarboxylic acid and forming the two components into a spray which is a mixture of the two components and collecting said spray upon said solid surface as an intimate mixture and effecting foaming and curing of the mixture.

References Cited in the file of this patent

UNITED STATES PATENTS

| | | |
|---|---|---|
| 2,450,503 | Drummond | Oct. 5, 1948 |
| 2,602,783 | Simon | July 8, 1952 |
| 2,634,244 | Simon | Apr. 7, 1953 |
| 2,650,212 | Windemuth | Aug. 25, 1953 |
| 2,657,151 | Gensel | Oct. 27, 1953 |

FOREIGN PATENTS

| | | |
|---|---|---|
| 700,611 | Great Britain | Dec. 9, 1953 |
| 700,617 | Great Britain | Dec. 9, 1953 |